(12) United States Patent
Mittler et al.

(10) Patent No.: US 11,493,129 B2
(45) Date of Patent: Nov. 8, 2022

(54) PISTON RING AND PISTON WITH INTERNAL GROOVE SEALING

(71) Applicant: FEDERAL-MOGUL BURSCHEID GMBH, Burscheid (DE)

(72) Inventors: Richard Mittler, Burscheid (DE); Fabian Ruch, Leverkusen (DE)

(73) Assignee: Federal-Mogul Burscheid GmbH, Burscheid (DE)

( * ) Notice: Subject to any disclaimer, the term of this patent is extended or adjusted under 35 U.S.C. 154(b) by 0 days.

(21) Appl. No.: 17/274,494

(22) PCT Filed: Sep. 2, 2019

(86) PCT No.: PCT/EP2019/073343
§ 371 (c)(1),
(2) Date: Mar. 9, 2021

(87) PCT Pub. No.: WO2020/053017
PCT Pub. Date: Mar. 19, 2020

(65) Prior Publication Data
US 2022/0049769 A1    Feb. 17, 2022

(30) Foreign Application Priority Data

Sep. 12, 2018   (DE) .......................... 102018122258.0

(51) Int. Cl.
*F16J 9/20*    (2006.01)
*F16J 9/02*    (2006.01)

(52) U.S. Cl.
CPC .. *F16J 9/20* (2013.01); *F16J 9/02* (2013.01)

(58) Field of Classification Search
CPC .................. F16J 9/20; F16J 9/02; F16J 9/22; F02F 5/00; F02F 3/00; F02F 3/10
See application file for complete search history.

(56) References Cited

U.S. PATENT DOCUMENTS 2,566,603 A * 9/1951 Dykes ........................ F16J 9/20
                                                          277/467
2,970,023 A * 1/1961 Thompson ................. F16J 9/20
                                                          277/460

(Continued)

FOREIGN PATENT DOCUMENTS

| BE | 466088 A | 7/1946 |
| DE | 2429977 A1 | 1/1975 |
| JP | 2006336744 A * | 12/2006 |

*Primary Examiner* — Grant Moubry
*Assistant Examiner* — James G Moubry
(74) *Attorney, Agent, or Firm* — Robert L. Stearns; Dickinson Wright, PLLC

(57) ABSTRACT

A piston ring has a running surface, an inner surface, a lower ring flank, and an upper ring flank. A recess, extending across the perimeter in the shape of an internal angle, is located at the transition between the inner surface and the upper ring flank. The recess defines a conical first surface and a conical second surface at the piston ring. The first surface lies farther outward, when viewed in the radial direction, and farther above, when viewed in the axial direction, than the second surface. In an axial cross section, a first angle between the axial direction and the first surface lies in the range between 10° and 50°, and a second angle between the radial direction and the second surface lies in the range between 5° and 30°. A piston having a piston ring groove includes a projection on the groove bottom. A combination made from an above-mentioned piston ring and an above-mentioned piston are adapted to one another, so that the projection projects into the recess.

26 Claims, 3 Drawing Sheets

(56) References Cited

U.S. PATENT DOCUMENTS

| | | | |
|---|---|---|---|
| 3,834,719 A | 9/1974 | Shin et al. | |
| 4,346,685 A * | 8/1982 | Fujikawa | F16J 9/02 |
| | | | 92/182 |
| 4,409,947 A * | 10/1983 | Yanagihara | F16J 9/00 |
| | | | 123/193.6 |
| 5,085,185 A * | 2/1992 | Heshmat | F01M 9/00 |
| | | | 123/193.6 |
| 5,695,199 A | 12/1997 | Rao et al. | |
| 8,955,487 B2 * | 2/2015 | Hampton | F16J 9/20 |
| | | | 277/357 |
| 9,494,233 B2 * | 11/2016 | Salenbien | F16J 9/14 |
| 2017/0321627 A1 | 11/2017 | Bieneman et al. | |

* cited by examiner

PISTON RING AND PISTON WITH INTERNAL GROOVE SEALING

BACKGROUND

1. Technical Field

The present invention relates to a piston ring for internal combustion engines, in particular a compression piston ring, and a piston interacting with the same, which are configured to be adapted to one another in an internal piston ring groove in order to improve the sealing effect at the upper flank.

2. Related Art

During the combustion of fuel, a high pressure is created which may cause gas to pass by the piston rings as so-called blow by from the combustion chamber into the crankcase. In particular, the piston ring in the uppermost piston groove should prevent this through contact with the piston groove; this type of piston ring is also designated as a compression piston ring.

Substantially rectangular rings, which are considered to be particularly robust, are primarily used as compression piston rings. Trapezoidal rings are also used for this purpose, which deviate slightly from the rectangular shape in such a way that their inner axial height is somewhat smaller than the outer axial height, and which continuously release oil carbon deposits by impacting them due to a change of the axial clearance connected to the radial movement of the piston ring relative to the piston, and thus reduce the accumulation of oil carbon deposits. Trapezoidal rings are used in grooves which are adapted to the trapezoidal shape of the ring, i.e., are likewise trapezoidal shaped.

In order to give piston rings a so-called twist, cross-sectional weakenings, like inner chamfers, are provided. By this means, a targeted contact situation, which differs across the perimeter, is created in the groove, and the attachment behavior at the groove is changed.

The object of the present invention is to provide a piston ring by means of which the accumulation of oil carbon deposits is prevented to the greatest extent on the one hand and a well-defined contact situation is present both at the groove and also at the cylinder slide way during operation on the other hand, in order to generally prevent blow by.

SUMMARY

A piston ring with a running surface, an inner surface, a lower ring flank, and an upper ring flank is provided, wherein a recess, extending across the perimeter in the shape of an internal angle, is located at the transition between the inner surface and upper ring flank. The recess defines a conical first surface and a conical second surface at the piston ring. The first surface lies farther outward, when viewed in the radial direction, and farther above, when viewed in the axial direction, than the second surface. In an axial cross section, a first angle between the axial direction and the first surface lies in the range between 10° and 50°, and a second angle between the radial direction and the second surface lies in the range between 5° and 30°.

According to one aspect, in the axial cross section, an angle between the first surface and the second surface may lie in the range between 105° and 150°.

According to another aspect, an axial height of the piston ring may lie in the range of 0.25-2 times a radial wall thickness of the piston ring, wherein a total axial height of the recess lies in the range of 0.5-0.7 times the height of the piston ring, and wherein a total radial depth of the recess lies in the range of 0.2-0.7 (preferably 0.25-0.5) times the wall thickness of the piston ring.

According to another aspect, the first surface and the second surface may transition into one another by means of a rounding, wherein a radius of curvature of the rounding preferably lies in the range of 0.25-1 times the sum of the total axial height of the recess and the total radial depth of the recess.

According to another aspect, at least one of the first surface or the second surface may be provided with a wear protection layer.

According to another aspect, the upper ring flank may be provided with a wear protection coating.

The problem is further solved according to the invention by a piston having a piston ring groove with a groove bottom and a lower groove flank, wherein a projection is arranged at an upper end of the groove bottom of the piston ring groove, wherein the projection has a conical first projection surface and a conical second projection surface, wherein the first projection surface lies farther outward, when viewed in the radial direction, and farther above, when viewed in the axial direction, than the second projection surface, wherein, in an axial cross section, an angle between the axial direction and the first projection surface lies in the range between 10° and 50°, and an angle between the radial direction and the second projection surface lies in the range between 5° and 30°.

According to one aspect of the piston, at least one of the first projection surface or the second projection surface may be provided with a wear protection coating.

The object is further solved according to the invention by a piston ring and piston combination comprising a piston ring as described above and a piston as described above, wherein the recess and the projection are designed in such a way that, when the piston ring is mounted in the piston ring groove, the projection projects into the recess, the second surface extends parallel to the second projection surface, and the first surface extends parallel to the first projection surface, or the first angle between the axial direction and the first surface is greater than the third angle between the axial direction and the first projection surface.

According to one aspect of the piston ring and piston combination, when the piston ring is mounted in the piston ring groove and the piston ring contacts the lower groove flank, the first surface may be spaced apart from the projection surface and the second surface may be spaced apart from the second projection surface.

According to another aspect, when the piston ring is mounted in the piston ring groove and the second surface contacts the second projection surface, an axial distance, which is preferably at least 45 μm, may exist between the first surface and the first projection surface.

According to another aspect, the piston ring groove may further comprise an upper groove flank and, when the piston ring is mounted in the piston ring groove and the second surface contacts the second projection surface, an axial distance may exist between the upper ring flank and the upper groove flank, which preferably lies in the range of 0.9-1.5 times the axial distance between the first surface and the first projection surface.

According to another aspect, an inner edge line of the first surface may have a larger radius than an inner edge line of the first projection surface.

According to another aspect, the difference of the radii of the inner edge line of the first surface and the inner edge line of the first projection surface may lie in the range from 15 µm to 300 µm.

According to another aspect, the first surface, the second surface, the first projection surface, and the second projection surface may be provided with a wear protection coating.

According to another aspect, the piston ring groove may lie at an upper end of the piston and be open at the top at a piston crown of the piston. 'Axial' and 'radial' are defined, as per usual, with reference to the axis defined through the piston ring, which coincides with the axis of the cylindrical shape of the piston. An axial direction is a direction parallel to this axis and a radial direction is a direction perpendicular to this axis. An axial section is a section, in which this axis lies in the sectional plane; an axial section is subsequently also designated as a cross section. With respect to the axial arrangement, 'above' indicates the combustion chamber side and 'below' indicates the crankcase side. 'Inward' and 'outward' relate to the axis of the piston ring/piston, when viewed from the radial direction.

THE DRAWINGS

Specific embodiments of the invention are subsequently described in greater detail with reference to the figures, wherein FIG. 1 shows a cross sectional view of a piston ring according to the invention;

Figure 1:
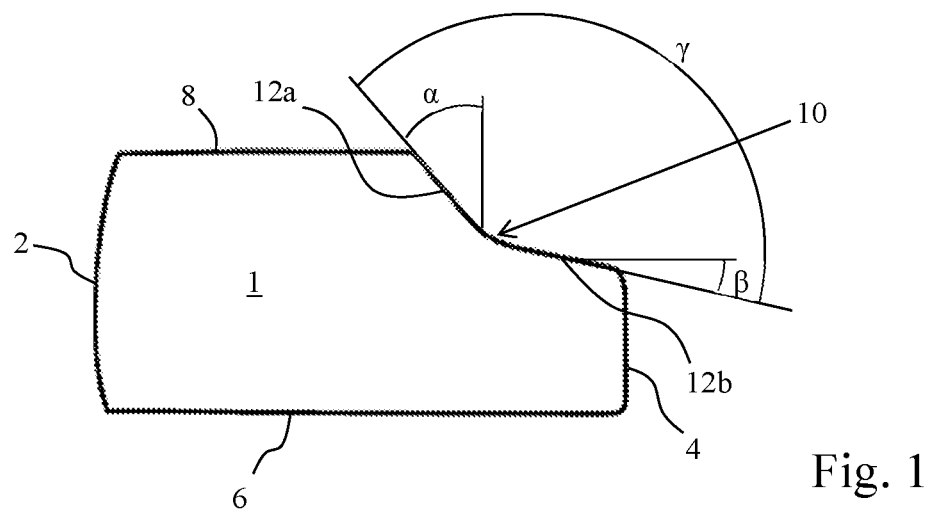

Identical reference numerals are subsequently used for identical or similar elements or components in both the description and also in the drawings. In addition, a list of reference numerals is provided which applies to all figures. The embodiments depicted in the figures are merely schematic and do not necessarily depict actual size ratios.

DETAILED DESCRIPTION

Figure 2:
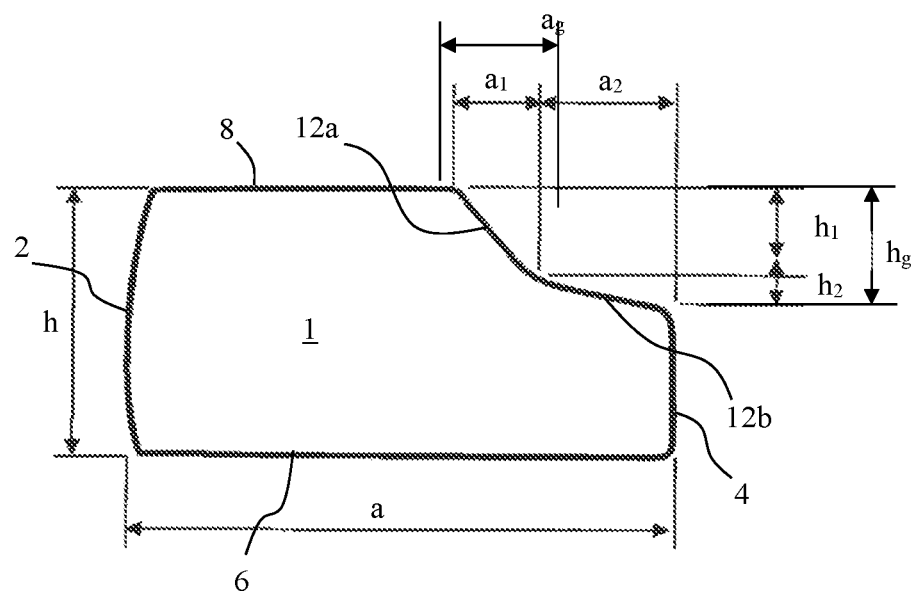
FIG. 2 shows a cross sectional view of a piston ring according to the invention with dimensions indicated.

FIGS. 1 and 2 depict a piston ring 1 according to the invention in a cross-sectional view, wherein angles are indicated in FIG. 1 and dimensions are indicated in FIG. 2. Piston ring 1 has a (radially outward) running surface 2, an inner surface 4 opposite the running surface, a lower ring flank 6 (located on the crankcase side) and an upper ring flank 8 (located on the combustion chamber side). At the transition from inner surface 4 to upper ring flank 8, (i.e., in an inner and upper area of the piston ring), there is a recess or cavity 10. Upper ring flank 8 and lower ring flank 6 are preferably parallel to one another. The running surface is preferably designed as rounded or convex ("barrel-shaped" in English); however, it may also extend in a straight line (in cross section), approximately perpendicular to the ring flanks or slightly oblique to the same, as in a tapered cone ring, likewise, the running surface may be configured similar to an oil scraper ring or a tapered cone oil scraper ring. The piston rings according to the present invention are preferably one piece. The recess extends across the entire periphery.

Recess 10 exists substantially (i.e., edges or transitions between the surfaces and between the surfaces and the inner surface or the upper groove flank may deviate slightly from the same, e.g., may be rounded or provided with a chamber) in the shape of an inward angle (stated precisely, the inward angle exists in the cross section). Two conical (truncated cone shaped) surfaces 12a, 12b are defined by recess 10, which, as it were, form the boundary surface, at least substantial portions thereof (i.e., aside from the transitions between the two surfaces and aside from the transitions between the two surfaces and the inner surface or the upper groove flank of the piston ring), of the piston ring body at cavity/recess 10. These two conical surfaces are designated as first surface 12a and second surface 12b, wherein first surface 12a lies radially farther outward than second surface 12b, and first surface 12a lies axially above second surface 12b. Note: It is clear to the person skilled in the art that the piston ring typically has a ring end gap, at which the conical surfaces are interrupted; the same applies for further ring- and annular structures of the piston ring: corresponding structures then extend across the entire periphery with the exception of the ring end gap.

In cross section, the piston ring thus comprises three sections in the radial direction: an inner semi-trapezoidal section, a center semi-trapezoidal section, and an outer substantially rectangular section (according to the preferred embodiments depicted in the figures). "Semi-trapezoidal" shall designate in this case an isosceles (symmetrical) trapezoid, bisected along a line perpendicular to the two parallel sides, i.e., in the case of a semi-trapezoid, two parallel sides are connected by one side, which is perpendicular to these two sides, while the fourth side is at an angle differing from 90° to the parallel sides (such a trapezoid is also designated as a so-called right trapezoid). "Substantially rectangular" shall again mean, that the outer section may deviate somewhat from the pure rectangular shape at the running surface, e.g., a convex running surface or an oblique running surface (similar to a tapered cone ring), or a configuration similar to an oil scraper ring or a tapered cone oil scraper ring is also conceivable. The oblique sides of the semi-trapezoidal shapes of the inner and center sections are each arranged upward and form the first and the second surface, when viewed with respect to the perimeter. The sides opposite these oblique sides lie, together with one side of the outer section, on a line, which forms the lower ring flank, when viewed with respect to the perimeter.

The angles, which, in an axial cross section, are formed by first and second surfaces 12a, 12b with the axial or radial direction, are limited as follows: a first angle $\alpha$ between the axial direction and first surface 12a lies in the range between 10° and 50° and a second angle $\beta$ between the radial direction and second surface (12b) lies in the range between 5° and 30°. First angle $\alpha$ preferably lies in the range between 20° and 40°; independently of this, second angle $\beta$ preferably lies in the range between 10° and 20°. As a whole, an axial height of the piston ring should preferably be monotonic in the area of the recess, more preferably strictly monotonic, and steadily diminishing.

According to one preferred embodiment, an angle $\gamma$, which, again in cross section, is formed between first surface 12a and second surface 12b, lies in the range between 105° and 150°, preferably between 115° and 140°, more preferably between 125° and 135°.

In FIG. 2, various dimensions are indicated which relate to recess 10. In particular, an axial height $h_1$ of first surface 12a and an axial height $h_2$ of second surface 12b, which substantially yield in sum a total axial height $h_g$ of recess 10. Furthermore, a radial depth $a_1$ of first surface 12a and a radial depth $a_2$ of second surface 12b are indicated, which substantially yield in sum a total radial depth $h_g$ of recess 10. "Substantially" relates to the fact that small deviations may occur based on the rounded/oblique transitions between the individual surfaces, i.e., the sums of the heights/depths of the first and second surfaces may optionally be somewhat smaller, e.g., 10% or 20% smaller than the total height or total depth of the recess, which shall relate to the total dimensions of the recess.

An axial height h of piston ring 1 preferably lies in the range of 0.25-2 times a radial wall thickness a of piston ring 1, wherein total axial height $h_g$ of recess 10 lies in the range of 0.5-0.7 times height h of piston ring 1, and wherein total radial depth $a_g$ of recess 10 lies in the range of 0.2-0.7, preferably 0.25-0.5, times wall thickness a of piston ring 1.

According to one embodiment, first surface 12a and second surface 12b are adjacent to one another. According to another preferred embodiment, first surface 12a and second surface 12b transition into one another by means of a rounding, wherein a radius of curvature of the rounding preferably lies in the range of 0.25-1 times, more preferably in the range of 0.25-0.4 times the sum of total axial height $h_g$ of recess 10 and total radial depth $a_g$ of recess 10.

Figure 3:
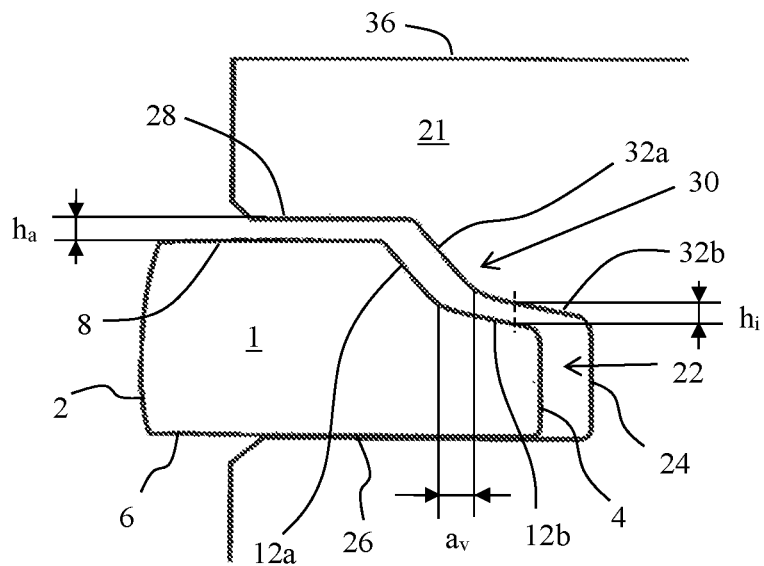
FIG. 3 shows a cross sectional view of a piston ring installed in a piston according to the invention.
Figure 7:
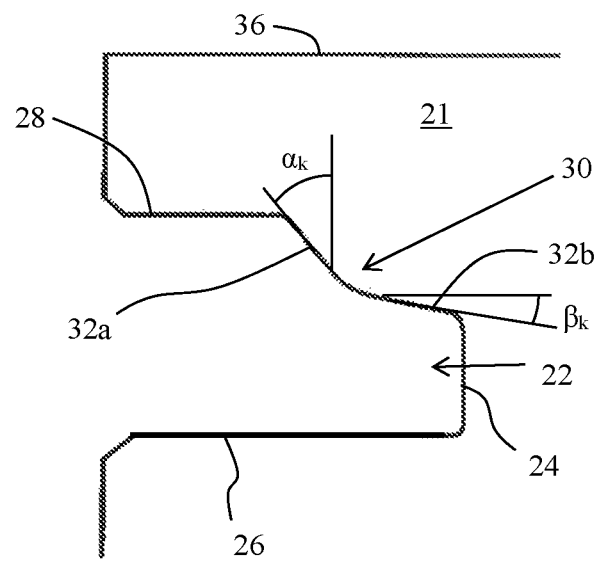
FIG. 7 shows a cross sectional view of a part a piston according to the invention.

FIG. 3 depicts, in a cross-sectional view, piston ring 1, mounted or installed in a piston ring groove 22 of a piston 21 according to the invention (which is only partially depicted). Piston 21, which is depicted in FIG. 7 without a piston ring, has a piston ring groove 22 with a groove bottom 24 and a lower groove flank 26. A projection 30, which extends across the periphery, is arranged at an upper end of groove bottom 24. Projection 30 has two conical surfaces 32a, 32b, which are designated as first projection surface 32a and second projection surface 32b. It hereby applies that first projection surface 32a lies (radially) farther outward and (axially) farther above second projection surface 32b. It is furthermore provided that, in an axial cross section, a third angle $\alpha_k$ between the axial direction and first projection surface 32a lies in the range between 10° and 50°, preferably between 20° and 40°, and a fourth angle $\beta_k$ between the radial direction and second projection surface 32b lies in the range between 5° and 30°, preferably between 10° and 20°.

According to one embodiment, first and second projection surfaces 32a, 32b are adjacent to one another. According to another preferred embodiment, the transition between first and second projection surfaces 32a, 32b is configured as rounded, i.e., first and second projection surfaces 32a, 32b transition into one another by means of a rounding.

Furthermore, piston ring groove 22 may have an upper groove flank 28, as is depicted in FIG. 3. However, a piston ring groove 22 open at the top at a piston crown 36 is also possible (see FIGS. 4a, 4b, and 6b), wherein piston ring 1 is then held in piston ring groove 22 by projection 30. Piston crown designates here the surface of the piston lying on the combustion chamber side, which then directly contacts combustion gases (also designated as the upper side of the top land).

It is provided according to the invention according to one embodiment, that piston ring 1 and piston 21 are combined in a piston ring-piston combination adapted to one another, see FIG. 3. Such a combination thus comprises a piston ring 1 and a piston 21, each as described above, which are configured to be adapted to one another such that recess 10 and projection 30 are designed such that, when piston ring 1 is mounted in piston ring groove 22, projection 30 projects into recess 10 and second surface 12b extends parallel to second projection surface 32b, and first surface 12a extends parallel to first projection surface 32a, or first angle α between the axial direction and first surface 12a is greater than third angle $\alpha_k$ between the axial direction and first projection surface 32a. Expressed differently, projection 30 thus projects into recess 10, second angle β is equal to fourth angle $\beta_k$, and first angle α is greater than or equal (preferably equal) to third angle $\alpha_k$. In the case that, as described above, the first and second surfaces transition into one another by means of a rounding, and the first and second projection surfaces also transition into one another by means of a rounding, then the radius of curvature of the rounding of the transition of the first/second surfaces is to be less than or equal to the radius of curvature of the rounding of the transition of the first/second projection surfaces, the radii of curvature are preferably equal.

Play in the axial direction (and also in the radial direction) preferably exists between piston ring 1 and piston 21. Thereby, in the case of a piston with a piston ring groove 22 that is not open at the top (as in FIG. 3), when piston ring 1 contacts lower groove flank 26, an axial distance $h_a$ between upper piston ring flank 8 and upper groove flank 28 is preferably at least 20 μm greater than an axial distance $h_i$ between second surface 12b and second projection surface 32b.

The inner edge of the first surface of the piston ring preferably lies (radially) farther outward than the inner edge of the first projection surface of the piston. I.e., an inner edge line of first surface 12a has a larger radius than an inner edge line of first projection surface 32a. The edge line designates here the radially inner edge of the conical surface or conical projection surface and correspondingly extends across the entire periphery, so that a circle is substantially formed (except for the ring end gap) whose radius is defined; the radius thus corresponds to the radial distance of the respective edge line from the axis of the piston ring. In the case that first and second surfaces 12a, 12b or first and second projection surfaces 32a, 32b contact one another, then the edge lines correspond to the respective boundary lines.

Radial distance $a_v$ between the two edge lines lies preferably in the range of 15 μm to 300 μm, more preferably in the range of 50 μm to 200 μm, even more preferably in the range from 100 μm to 150 μm. This distance $a_v$ corresponds to the difference of the radii of the inner edge line of first surface 12a and the inner edge line of first projection surface 32a.

In subsequently described FIGS. 4a, 4b, 5, 6a, 6b, which depict different embodiments of piston ring-piston combinations in a cross-sectional view, and in which the piston is in each case only partially depicted, not all reference numbers are included for the sake of clarity; instead, only those essential for the description are included. Thus, that which was previously stated in connection with FIGS. 1-3 continues to apply, though not specifically mentioned.

Figures 4A, 4B:
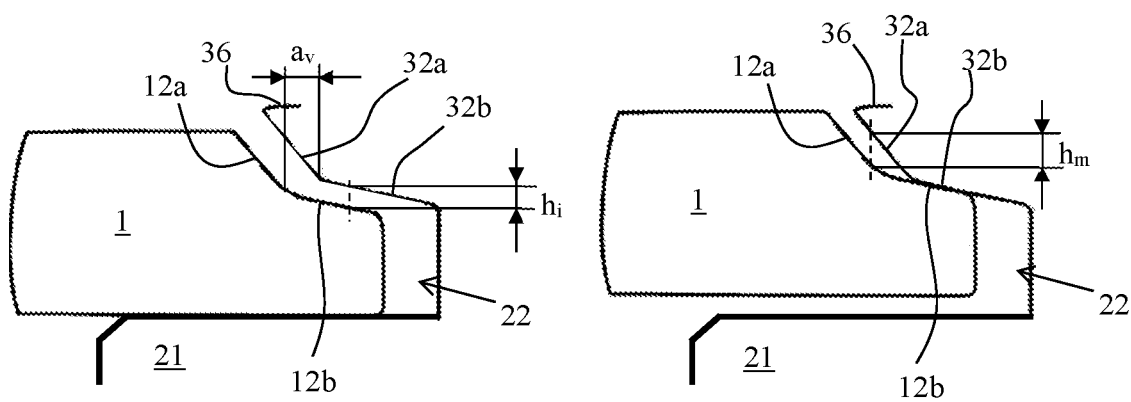
FIGS. 4a and 4b show cross sectional views of a piston ring installed in a piston during various operating states.

FIGS. 4a and 4b show cross-sectional views of a piston ring 1 installed in a piston 21 in different operating states. Piston ring groove 22 is hereby arranged, for example, at the upper end of piston 21 and designed as open at piston crown 36: piston ring 1 is held in piston ring groove 22 by the projection arranged at the groove bottom and the pressure of the combustion gases acts directly on upper ring flank 8.

In FIG. 4a, piston ring 1 contacts the lower groove flank. As mentioned in conjunction with FIG. 3, axial distance $h_i$ between second surface 12b and second projection surface 32b and radial distance $a_v$ between the inner edge lines of first surface 12a and first projection surface 32a are also indicated.

In FIG. 4b, piston ring 1 is shown in an operating state, in which it has moved upward relative to piston 21 and contacts the projection, i.e., second surface 12b contacts second projection surface 32b. The contact between piston ring 1 and the projection exists only at second surface 12b and second projection surface 32b due to radial distance $a_v$ between the inner edge lines of first surface 12a and first projection surface 32a and due to the angular configuration, in which, among other things, first surface 12a and first projection surface 32a, which lie farther outward when viewed in the radial direction, extend at a steeper angle than more inward, second surface 12b and second projection surface 32b, which lie farther inward. Since these surfaces are configured similarly to a conventional trapezoidal ring, the accumulation of oil carbon deposits is prevented. Furthermore, the ring twist occurring due to the recess is reduced or eliminated by this contact, so that the running surface contacts the cylinder running surface in a precisely defined, desired way, e.g., with a desired convex contact.

A distance $h_m$ also exists between first surface 12a and first projection surface 32 in the operating state shown in FIG. 4b, such that a clearance exists into which gasses may arrive in order to press piston ring 1 outward to the cylinder running surface. This axial distance $h_m$ between first surface 12a and first projection surface 32a is preferably at least 45 µm (when second surface 12b contacts second projection surface 32b).

Figure 5:
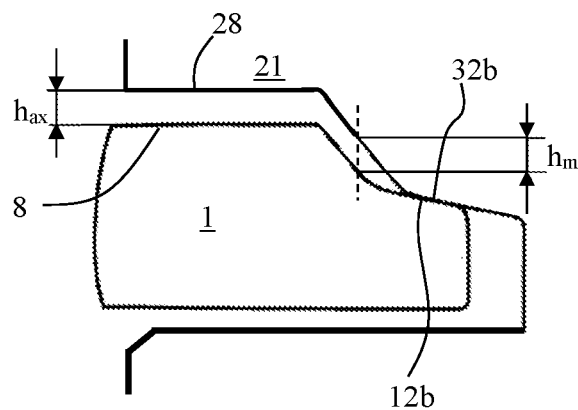
FIG. 5 shows a cross sectional view of a piston ring installed in a piston, in a state in which the piston ring contacts the projection arranged at the groove bottom.

FIG. 5 depicts a piston ring 1, installed in a piston ring groove 22, which is not open at the top, of a piston 21 and in a state, in which piston ring 1 contacts the projection, i.e., second surface 12b contacts second projection surface 32b. FIG. 5 thus corresponds to FIG. 4b, FIG. 4a corresponds to FIG. 3. Correspondingly, that stated in connection with FIGS. 4a and 4b also applies here, with the exception of the configuration of the piston ring groove which is not open at the top.

An axial distance $h_{ax}$ between upper ring flank 8 and upper groove flank 28 exists in the operating state shown in FIG. 5. This enables gasses to arrive into the clearance between first surface 12a and first projection surface 32a. This axial distance $h_{ax}$ lies preferably in the range of 0.9-1.5 times axial distance $h_m$ between first surface 12a and first projection surface 32a, when second surface 12b contacts second projection surface 32b.

Figures 6A, 6B:
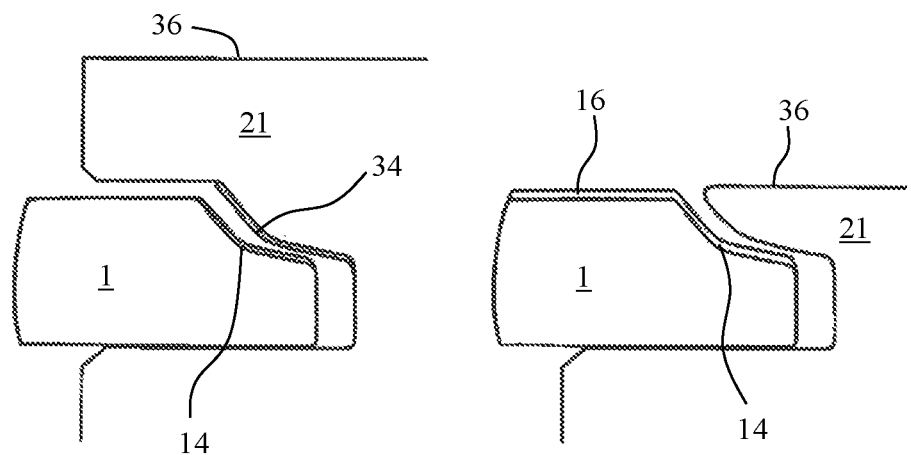
FIGS. 6a and 6b show exemplary embodiments with wear protection coatings.

Furthermore, both the piston ring and also the piston may be provided, independently of one another, with a wear protection coating at suitable points, as depicted in FIG. 6a (with a piston ring groove not open at the top) and in FIG. 6b (with a piston ring groove open, for example, at the top). A wear protection coating 14, 16 is preferably applied on piston ring 1 at first and/or second surface 12a, 12b or also on upper ring flank 8 (FIG. 6b). A wear protection coating 34 is applied on piston 21 preferably at projection 30, i.e., on first and/or second projection surface 32a, 32b. It is particularly preferred (FIG. 6a) to provide both first and second surfaces 12a, 12b and also projection 30 with a wear protection coating.

The invention claimed is:

1. A piston ring and piston combination,
   the piston ring including a running surface, an inner surface, a lower ring flank, and an upper ring flank;
   wherein a recess, extending across the perimeter in the shape of an internal angle, is located at a transition between the inner surface and the upper ring flank; wherein the recess defines a conical first surface and a conical second surface, wherein the first surface lies farther outward, when viewed in the radial direction, and farther above, when viewed in the axial direction, than the second surface; wherein, in an axial cross section, a first angle between the axial direction and the first surface lies in the range between 10° and 50°, and a second angle between the radial direction and the second surface lies in the range between 5° and 30°;
   the piston including a piston ring groove comprising a groove bottom and a lower groove flank, wherein a projection is arranged at an upper end of the groove bottom of the piston ring groove; wherein the projection has a conical first projection surface and a conical second projection surface, wherein the first projection surface lies farther outward, when viewed in the radial direction, and farther above, when viewed in the axial direction, than the second projection surface, wherein, in an axial cross section, a third angle between the axial direction and the first projection surface lies in the range between 10° and 50°, and a fourth angle between the radial direction and the second projection surface lies in the range between 5° and 30°;
   wherein the recess and the projection are designed such that, when the piston ring is mounted in the piston ring groove: the projection projects into the recess, the second surface extends parallel to the second projection surface, and the first surface extends parallel to the first projection surface or the first angle between the axial direction and the first surface is greater than the third angle between the axial direction and the first projection surface; and
   wherein an inner edge line of the first surface has a greater radius than an inner edge line of the first projection surface.

2. The piston ring and the piston combination according to claim 1, wherein in the axial cross section, an angle between the first surface and the second surface lies in the range between 105° and 150°.

3. The piston ring and the piston combination according to claim 1, wherein, an axial height of the piston ring lies in the range of 0.25-2 times a radial wall thickness of the piston ring, wherein a total axial height of the recess lies in the range of 0.5-0.7 times the height of the piston ring; and wherein a total radial depth of the recess lies in the range of 0.2-0.7 times the wall thickness of the piston ring.

4. The piston ring and the piston combination according to claim 1, wherein the first surface and the second surface transition into one another by means of a rounding.

5. The piston ring and the piston combination according to claim 1, wherein at least one of the first surface and the second surface is provided with a wear protection layer.

6. The piston ring and the piston combination according to claim 1, wherein the upper ring flank is provided with a wear protection coating.

7. The piston ring and the piston combination according to claim 1, wherein at least one of the first projection surface and the second projection surface is provided with a wear protection coating.

8. The piston ring and the piston combination according to claim 1, wherein the piston ring is mounted in the piston ring groove and the piston ring contacts the lower groove flank, the first surface is spaced apart from the projection surface and the second surface is spaced apart from the second projection surface.

9. The piston ring and the piston combination according to claim 1, wherein, when the piston ring is mounted in the piston ring groove and the second surface contacts the second projection surface, an axial distance exists between the first surface and the first projection surface.

10. The piston ring and the piston combination according to claim 9, wherein the piston ring groove additionally comprises an upper groove flank, and wherein, when the piston ring is mounted in the piston ring groove and the second surface contacts the second projection surface, an axial distance exists between the upper ring flank and the upper groove flank, which lies in the range of 0.9-1.5 times the axial distance between the first surface, and the first projection surface.

11. A piston ring and piston combination,
the piston ring including a running surface, an inner surface, a lower ring flank, and an upper ring flank; wherein a recess, extending across the perimeter in the shape of an internal angle, is located at a transition between the inner surface and the upper ring flank; wherein the recess defines a conical first surface and a conical second surface, wherein the first surface lies farther outward, when viewed in the radial direction, and farther above, when viewed in the axial direction, than the second surface; wherein, in an axial cross section, a first angle between the axial direction and the first surface lies in the range between 10° and 50°, and a second angle between the radial direction and the second surface lies in the range between 5° and 30°;
the piston including a piston ring groove comprising a groove bottom and a lower groove flank, wherein a projection is arranged at an upper end of the groove bottom of the piston ring groove; wherein the projection has a conical first projection surface and a conical second projection surface, wherein the first projection surface lies farther outward, when viewed in the radial direction, and farther above, when viewed in the axial direction, than the second projection surface, wherein, in an axial cross section, a third angle between the axial direction and the first projection surface lies in the range between 10° and 50°, and a fourth anele between the radial direction and the second projection surface lies in the range between 5° and 30°;
wherein the recess and the projection are designed such that, when the piston ring is mounted in the piston ring groove: the projection projects into the recess, the second surface extends parallel to the second projection surface, and the first surface extends parallel to the first projection surface or the first angle between the axial direction and the first surface is greater than the third angle between the axial direction and the first projection surface;
wherein an inner edge line of the first surface has a greater radius than an inner edge line of the first projection surface; and
wherein a difference of the radii of the inner edge line of the first surface and the inner edge line of the first projection surface lies in the range from 15 µm to 300 µm.

12. The piston ring and the piston combination according to claim 1, wherein the first surface, the second surface, the first projection surface, and the second projection surface are provided with a wear protection coating.

13. The piston ring and the piston combination according to claim 1, wherein the piston ring groove is situated in an upper end of the piston and is open above to a piston crown of the piston.

14. The piston ring and the piston combination according to claim 3, wherein the total radial depth ($a_g$) of the recess lies in the range of 0.25-0.5 times the wall thickness (a) of the piston ring.

15. The piston ring and the piston combination according to claim 9, wherein the axial distance ($h_m$) is at least 45 µm.

16. A piston ring and piston combination,
the piston ring including a running surface, an inner surface, a lower ring flank, and an upper ring flank; wherein a recess, extending across the perimeter in the shape of an internal angle, is located at a transition between the inner surface and the upper ring flank; wherein the recess defines a conical first surface and a conical second surface, wherein the first surface lies farther outward, when viewed in the radial direction, and farther above, when viewed in the axial direction, than the second surface; wherein, in an axial cross section, a first angle between the axial direction and the first surface lies in the range between 10° and 50°, and a second angle between the radial direction and the second surface lies in the range between 5° and 30°;
the piston including a piston ring groove comprising a groove bottom and a lower groove flank, wherein a projection is arranged at an upper end of the groove bottom of the piston ring groove; wherein the projection has a conical first projection surface and a conical second projection surface, wherein the first projection surface lies farther outward, when viewed in the radial direction, and farther above, when viewed in the axial direction, than the second projection surface, wherein, in an axial cross section, a third angle between the axial direction and the first projection surface lies in the range between 10° and 50°, and a fourth angle between the radial direction and the second projection surface lies in the range between 5° and 30°;
wherein the recess and the projection are designed such that, when the piston ring is mounted in the piston ring groove: the projection projects into the recess, the second surface extends parallel to the second projection surface, and the first surface extends parallel to the first projection surface or the first angle between the axial direction and the first surface is greater than the third angle between the axial direction and the first projection surface;
wherein, when the piston ring is mounted in the piston ring groove and the second surface contacts the second projection surface, an axial distance exists between the first surface and the first projection surface; and
wherein the piston ring groove additionally comprises an upper groove flank, and wherein, when the piston ring is mounted in the piston ring groove and the second surface contacts the second projection surface, an axial distance exists between the upper ring flank and the upper groove flank, which lies in the range of 0.9-1.5 times the axial distance between the first surface, and the first projection surface.

17. The piston ring and the piston combination according to claim 16, wherein in the axial cross section, an angle between the first surface and the second surface lies in the range between 105° and 150°.

18. The piston ring and the piston combination according to claim 16, wherein, an axial height of the piston ring lies in the range of 0.25-2 times a radial wall thickness of the piston ring, wherein a total axial height of the recess lies in the range of 0.5-0.7 times the height of the piston ring; and wherein a total radial depth of the recess lies in the range of 0.2-0.7 times the wall thickness of the piston ring.

19. The piston ring and the piston combination according to claim 16, wherein the first surface and the second surface transition into one another by means of a rounding.

20. The piston ring and the piston combination according to claim 16, wherein at least one of the first surface and the second surface is provided with a wear protection layer.

21. The piston ring and the piston combination according to claim 16, wherein the upper ring flank is provided with a wear protection coating.

22. The piston ring and the piston combination according to claim 16, wherein at least one of the first projection surface and the second projection surface is provided with a wear protection coating.

23. The piston ring and the piston combination according to claim 16, wherein the first surface, the second surface, the first projection surface, and the second projection surface are provided with a wear protection coating.

24. The piston ring and the piston combination according to claim 16, wherein the piston ring groove is situated in an upper end of the piston and is open above to a piston crown of the piston.

25. The piston ring and the piston combination according to claim 18, wherein the total radial depth ($a_g$) of the recess lies in the range of 0.25-0.5 times the wall thickness (a) of the piston ring.

26. The piston ring and the piston combination according to claim 16, wherein the axial distance ($h_m$) is at least 45 μm.

* * * * *